April 29, 1958 G. W. JOHANSEN 2,832,451
REVERSING CLUTCH MECHANISM
Filed Oct. 17, 1955 2 Sheets-Sheet 1

INVENTOR
G. W. Johansen
BY
ATTORNEYS

April 29, 1958    G. W. JOHANSEN    2,832,451
REVERSING CLUTCH MECHANISM
Filed Oct. 17, 1955    2 Sheets-Sheet 2

INVENTOR
G. W. Johansen
BY
ATTORNEYS

United States Patent Office 2,832,451
Patented Apr. 29, 1958

2,832,451

REVERSING CLUTCH MECHANISM

Gordon W. Johansen, Stockton, Calif.

Application October 17, 1955, Serial No. 540,720

1 Claim. (Cl. 192—51)

This invention relates to a manually controlled clutch adapted to be interposed between drive and driven shafts; the major object of the invention being to provide a reversing clutch having what I believe to be a novel mechanism constructed and arranged so that the driven shaft may be rotated in the same direction as the drive shaft, held stationary relative to the drive shaft, or caused to rotate in the opposite direction to said drive shaft.

A further object is to provide a clutch of the above nature which includes a rigid disc rigidly secured to the driven shaft or axle, normally engaged but releasable clutch plates connecting one face of the disc and the drive shaft, and other normally released but engageable clutch plates connecting the other face of the disc, and a sleeve on the drive shaft driven in unison therewith but in a reverse direction, and control means to engage or disengage the opposed clutch plates at the will of the operator.

A further object of the invention is to provide a reversing clutch mechanism which is designed for ease and economy of manufacture.

A still further object of the invention is to provide a practical, reliable, and durable reversing clutch mechanism, and one which is exceedingly effective for the purpose for which it is designed.

These objects are accomplished by means of such structure and relative arrangement of parts as will fully appear by a perusal of the following specification and claim.

Figure 1:
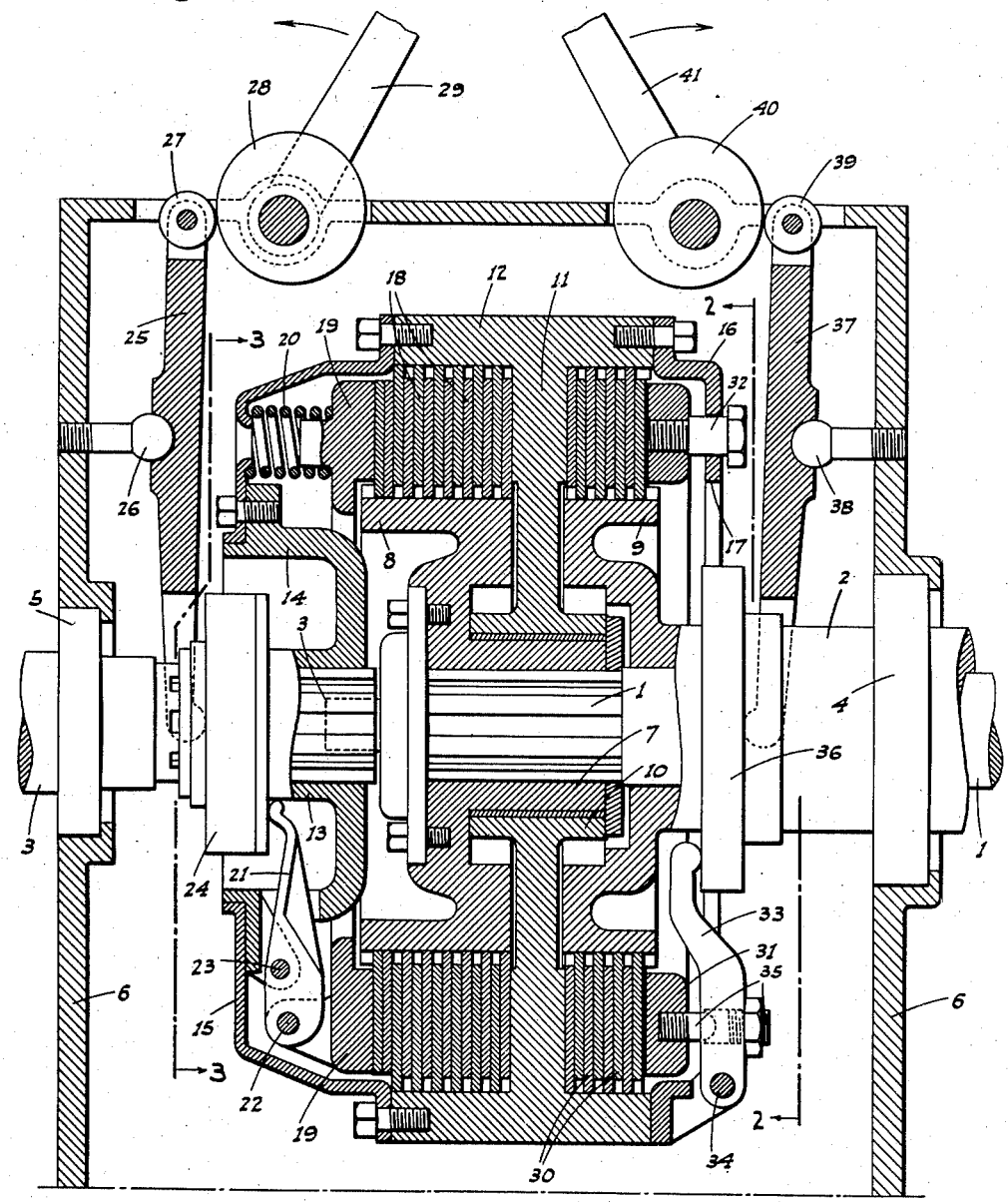
Fig. 1 is a sectional elevation of the improved reversing clutch shown in its normal setting.
Figure 2:
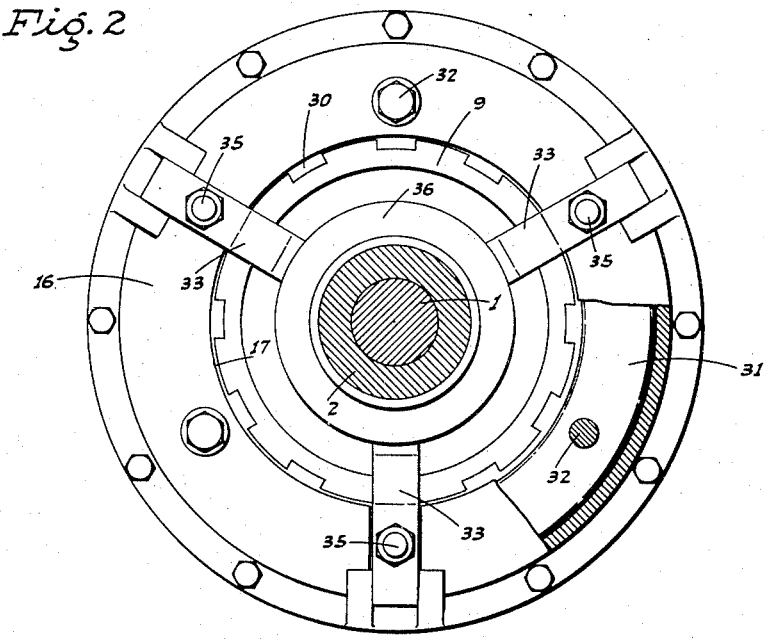
Fig. 2 is an end section on line 2—2 of Fig. 1.
Figure 3:
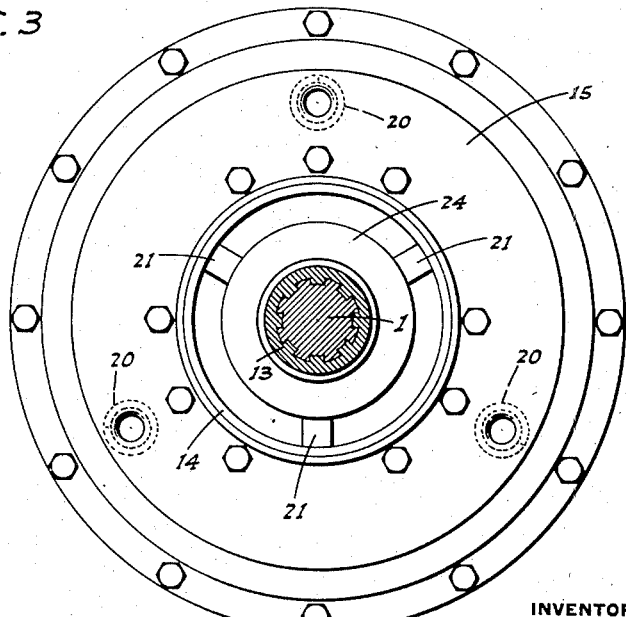
Fig. 3 is a similar view on line 3—3 of Fig. 1.

Referring now more particularly to the drawings and to the characters of reference marked thereon, the clutch structure includes a drive shaft 1, a sleeve 2 turning in the opposite direction on the shaft 1 intermediate its ends, and a driven shaft or axle 3 axially alined with the drive shaft and extending beyond one end of the same. The sleeve and axle are journaled in suitable bearings 4 and 5, respectively, mounted in a clutch enclosing housing 6.

Keyed on the portion of shaft 1 which is exposed between sleeve 2 and the adjacent end of axle 3, is the hub 7 of an inner external clutch drum 8, while formed with the adjacent end of sleeve 2 is another inner external clutch drum 9, the same size as drum 8 but spaced therefrom.

Turnable on hub 7 is the hub 10 of a disc 11 which projects between drums 8 and 9 and terminates in an outer internal clutch drum 12 which is disposed some distance radially out from drums 8 and 9 and overhangs the same.

Keyed on axle 3, at the end thereof adjacent shaft 1, is the hub 13 of an outwardly facing cup 14 on the axially outer end of which is secured an end cap 15 which, at its radially outer end, is secured to the adjacent end of drum 12.

Another end cap 16, having an enlarged central opening 17, is secured to the other end of drum 12.

A plurality of clutch plates or discs 18 are alternately slidably splined in drum 8 and the adjacent portion of drum 12. The plate 18 furthest from disc 11 is engaged by a pressure ring 19 yieldably held against said plate 18 by circumferentially spaced springs 20 extending between the pressure ring and the end cap 15.

Circumferentially spaced radial levers 21, pivoted at their outer ends on the ring 19—as at 22—and intermediate their ends on the cup 14—as at 23—project through the side of the cup 14. At their inner ends, the radial levers 21 engage the side of a shifting collar 24 which faces the bottom of cup 14, and which collar is slidable on the hub 13 of said cup. When the collar is advanced in the direction of the bottom of the cup, or toward the pressure ring 19, said ring will be pulled away from the clutch plates 18 against the action of the springs 20, and will thus release the clutch plates 18 from driving connection between the drums 8 and 12.

Such advance of the shifting collar is controlled by a fork lever 25 engaging the opposite side of said collar and pivoted intermediate its ends on the side of the housing 6—as at 26. At its outer end, lever 25 carries a roller 27 disposed for engagement by an eccentric cam 28 turnably supported in the housing 6 and which may be rotated—to press against the roller 27 and swing lever 25 in a collar advancing direction—by a hand lever 29 or the like.

A plurality of clutch plates or discs 30 are alternately slidably splined in drum 9 and the adjacent portion of drum 12 so that a drive connection may be established between the sleeve 2 and the drum 12 to which the axle 3 is permanently connected.

A pressure ring 31, normally disengaged from pressing relation with the clutch plates 30, is supported for sliding movement axially of shaft 1 by circumferentially spaced bolts 32 projecting from the ring and slidably mounted in the end cap 16.

Circumferentially spaced radial levers 33 are pivoted at their outer ends on the end cap 16—as at 34—and intermediate their ends are connected to the ring 31 by adjustable push-pin units 35. At their radially inner ends, the levers 33 engage one side face of a shifting collar 36 slidable on sleeve 2 and project into opening 17 of end cap 16. Upon movement of shifting collar 36 in the direction of drum 9, ring 31 will be advanced into pressing engagement with the clutch plates 30, establishing a drive connection between the sleeve 2 and axle 3.

Such movement of the collar 36 is effected by means of a fork lever 37 engaging said collar on the side opposite the levers 33, and pivoted intermediate its ends in connection with the adjacent side of the housing 6—as at 38. At its outer end, lever 37 carries roller 39 disposed for engagement by an eccentric cam 40 turnably supported in the housing 6 and which may be rotated in a direction to press against the roller 39 and swing lever 37 in a collar-advancing direction by a hand lever 41, or the like.

From the above description, it will be seen that the shaft 1 is normally connected to axle 3—to rotate said axle in the same direction as the shaft—through drums 8 and 12; the clutch plates 30 between drums 9 and 12 being normally disengaged so that said drums are free to turn relative to each other. If pressure ring 19 is pulled away to release clutch plates 18 by rotation of cam 28, the drive shaft 1 is disengaged from axle 3.

If the cam 40 is then rotated to cause pressure ring 31 to advance and engage clutch plates 30, a drive to axle 3 in the opposite direction is established between sleeve 2 and axle 3 through drums 9 and 12.

Figure 4:
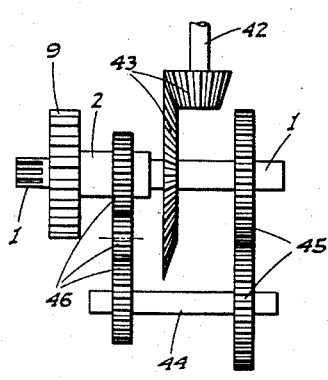
Fig. 4 is a diagram of the preferred form of reverse drive connection between the drive shaft and the sleeve thereon.

The sleeve 2 is connected to turn with shaft 1 at the same speed but in the opposite direction by suitable means such as is shown diagrammatically in Fig. 4. As depicted in said figure, the drive shaft 1 is connected—intermediate its ends—to the engine or power shaft 42 by bevel gearing 43 so that clutch and axle mechanisms may be operatively associated with both ends of said shaft 1. A countershaft 44 is mounted parallel to the shaft 1 and is connected to the central portion of the same by spur gears 45 arranged so that shafts 1 and 44 turn in opposite directions. Countershaft 44 is connected to sleeve 2—between drum 9 thereon and the bevel gearing 43—by a spur gear train 46 arranged so that said countershaft and sleeve rotate in the same direction, which direction is the opposite of that of shaft 1.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

A clutch mechanism comprising, with a drive shaft and a driven shaft, a drive sleeve turnable on the drive shaft and operatively connected thereto in revesrse driving relation, a normally engaged clutch connection between the drive and driven shafts, a normally disengaged clutch connection between the driven sleeve and the driven shaft and included in part with the first named clutch connection, manually operated means to disengage the first named clutch connection, and a separate independently operable manual means to engage the last named clutch connection.

References Cited in the file of this patent

UNITED STATES PATENTS

| | | |
|---|---|---|
| 2,237,322 | West | Apr. 8, 1941 |
| 2,396,456 | Campodonico | Mar. 12, 1946 |